United States Patent [19]

Kao

[11] Patent Number: 5,374,933
[45] Date of Patent: Dec. 20, 1994

[54] POSITION CORRECTION METHOD FOR VEHICLE NAVIGATION SYSTEM

[75] Inventor: Wei-Wen Kao, Fremont, Calif.

[73] Assignee: Zexel Corporation, Tokyo, Japan

[21] Appl. No.: 950

[22] Filed: Jan. 5, 1993

[51] Int. Cl.⁵ .......................... H04B 7/185; G01S 5/02
[52] U.S. Cl. ..................... 342/357; 364/449
[58] Field of Search ................. 342/357; 364/449

[56] References Cited

U.S. PATENT DOCUMENTS

| | | | |
|---|---|---|---|
| 3,845,289 | 10/1974 | French | 235/151 |
| 4,570,227 | 2/1986 | Tachi et al. | 364/444 |
| 4,608,656 | 8/1986 | Tanaka et al. | 364/449 |
| 4,611,293 | 9/1986 | Hatch et al. | 364/571 |
| 4,672,565 | 6/1987 | Kuno et al. | 364/571 |
| 4,673,878 | 6/1987 | Tsushima et al. | 324/226 |
| 4,723,218 | 2/1988 | Hasebe et al. | 364/449 |
| 4,734,863 | 3/1988 | Honey et al. | 364/449 |
| 4,751,512 | 6/1988 | Longaker | 342/357 |
| 4,782,447 | 11/1988 | Ueno et al. | 364/449 |
| 4,796,191 | 1/1989 | Honey et al. | 364/450 |
| 4,797,841 | 1/1989 | Hatch | 364/571 |
| 4,831,563 | 5/1989 | Ando et al. | 364/571 |
| 4,862,398 | 8/1989 | Shimizu et al. | 364/571 |
| 4,914,605 | 4/1990 | Loughmiller, Jr. et al. | 364/518 |
| 4,918,609 | 4/1990 | Yamawaki | 364/449 |
| 4,926,336 | 5/1990 | Yamada | 364/444 |
| 4,937,753 | 6/1990 | Yamada | 364/449 |
| 4,964,052 | 10/1990 | Ohe | 364/449 |
| 4,970,652 | 11/1990 | Nagashima | 364/449 |
| 4,982,332 | 1/1991 | Saito et al. | 364/449 |
| 4,984,168 | 1/1991 | Neukirchner et al. | 364/449 |
| 4,989,151 | 1/1991 | Niumura | 364/449 |
| 4,992,947 | 2/1991 | Niumura et al. | 364/444 |
| 4,996,645 | 2/1991 | Schneyderberg Van Der Zon | 364/449 |
| 4,999,783 | 3/1991 | Tenmoku et al. | 364/450 |
| 5,040,122 | 8/1991 | Neukirchner et al. | 364/449 |
| 5,046,011 | 9/1991 | Kahihara et al. | 364/449 |
| 5,060,162 | 10/1991 | Ueyama et al. | 364/449 |
| 5,283,743 | 2/1994 | Odagawa | 364/457 |
| 5,287,297 | 2/1994 | Ihara et al. | 364/449 |
| 5,297,050 | 3/1994 | Ichimura et al. | 364/444 |

OTHER PUBLICATIONS

R. L. French, "MAP Matching Origins Approaches and Applications," Rober L. French & Associates, 3815 Lisbon St., Suite 201, Forth Worth, Texas 76107, U.S.A., pp. 91–116.

Primary Examiner—Theodore M. Blum
Attorney, Agent, or Firm—Townsend and Townsend, Khourie and Crew

[57] ABSTRACT

A vehicle navigation system is used to determine the absolute position of a vehicle with improved accuracy on freeways or rural highways. First, the system stores a known vehicle position in its memory. As the vehicle moves away from the known position, the system uses a variety of means to sense external signals. These means include satellite transmission receivers and magnetic compasses. When a change in the external signals occurs, the system recognizes the presence of a landmark which can then be used to set the vehicle's position. To accomplish this, the system's data processor searches a map data base, attempting to fix the position of the sensed landmark with respect to the initially stored known position. When the system identifies the most likely landmark, the position of the vehicle is then reset to that position.

26 Claims, 4 Drawing Sheets

POSITION CORRECTION METHOD FOR VEHICLE NAVIGATION SYSTEM

BACKGROUND OF THE INVENTION

This invention relates to a method and apparatus for determining absolute vehicle position in vehicle navigation systems.

In vehicle navigation systems, a vehicle's position is determined through the accumulation of data gathered by various navigation sensors. Typical navigation sensors include compasses to measure the absolute vehicle heading relative to the earth's magnetic field; gyroscopes and differential odometers to measure the vehicle's relative heading; and odometers to measure the absolute distance traveled by the vehicle. Errors in vehicle position result from the accumulation of measurement errors by each of the sensors. Compass measurements are affected by magnetic anomalies such as steel bridges or buildings. Gyroscopes and differential odometers tend to have higher resolution, but their outputs are subject to drifting phenomena. As these measurement errors accumulate, the error in the vehicle position calculated by the navigation system increases.

In the past, a technique known as "map matching" has been used to correct vehicle position errors which result from the accumulation of navigation sensor errors. Map matching uses geometrical similarities in its decision making process. The navigation system compares the current vehicle trajectory to street geometries near the currently stored vehicle position. The system then corrects the vehicle position to the location which most closely matches the vehicle's trajectory.

To accomplish this, the system searches its internal map data base in the vicinity of the most recently calculated vehicle position to find street candidates which lie in the direction in which the vehicle is currently headed. The vehicle's heading, speed, and distance traveled are continuously monitored and compared to the geometry of the current "list" of street candidates. As the geometry of each street diverges from the vehicle's calculated trajectory, that street is eliminated as a possible location. This process continues until all streets are eliminated except one. That street is then stored as the current location of the vehicle.

Map matching has proven to be an effective position error correction technique in an urban environment. The nature of city streets provides a construct flow of information from the navigation sensors to the system because of the distinct character of the vehicle's trajectory. In essence, the relatively high number of significant navigation events (e.g., turns) and the short distances between such events result in a relatively accurate calculation of the vehicle's trajectory and thus a good approximation of the vehicle's absolute position.

However, map matching has been shown to be inadequate for correcting vehicle position errors on freeways and rural highways. On a freeway, for example, a vehicle can travel a great distance without the occurrence of any significant navigation events. The infrequent occurrence of the navigation events which are required for a map matching technique to make its decisions means that position corrections will rarely be calculated. Given this fact and the continuous accumulation of errors from the navigation sensors, it becomes apparent that the errors in the calculated position of the vehicle will eventually become too large for map matching to correct.

Error correction can also be achieved through the use of a global positioning system (GPS). Through the use of satellites and ground based receivers, GPS is capable of determining a vehicle's absolute position which can then be used to correct position errors made by vehicle navigation systems. However, the accuracy of GPS is dramatically affected by satellite geometry and selective availability degradation. Errors as great as a few hundred meters are not uncommon. Thus, GPS is not an entirely reliable method of position error correction.

Therefore, a method and apparatus are needed for the determination of vehicle position in vehicle navigation systems which are capable of reliably correcting vehicle position error while operating on freeways or rural highways.

SUMMARY OF THE INVENTION

According to the invention, a vehicle navigation system and method determines the absolute position of a vehicle with improved accuracy over simple map matching techniques. In a preferred embodiment, the system first stores a known vehicle position in its memory. As the vehicle moves away from the known position, the system monitors external signals such as the geomagnetic field or GPS signal availability. When a change in the external signals occurs because of a nearby landmark, the system uses the location of the landmark to set the vehicle's position. To accomplish this, the system's processing means examines a map data base, attempting to fix the position of the sensed landmark with respect to the initially stored known position. When the system identifies the most likely landmark, the position of the vehicle is then reset to that position. This technique can be thought of as "phenomenon matching."

The invention may simultaneously use more than one scheme for sensing external phenomena so that protection may be afforded against failures to sense existing phenomena as well as false positives. One embodiment uses the availability of GPS signals for error correction. The navigation system employs a GPS receiver which receives continuous transmissions from GPS satellites. As the vehicle travels under a freeway overpass, the navigation system will experience a momentary loss of the GPS signal. The system can then assume that the vehicle has passed under an overpass and proceed to pinpoint its absolute position. The system's decision-making process can be suitably modified to lessen the probability of the system mistaking other phenomena for freeway overpasses.

In a second embodiment, the system uses the signal output of a geomagnetic field sensor (e.g., compass) to detect perturbations caused by landmarks such as bridges, tunnels, overpasses, or geologic formations. The compass signal output is compared to the signal output of a relative heading sensor such as a gyroscope to identify changes in the compass output caused by these landmarks rather than actual changes in heading. Preferably, the difference in compass and gyroscope heading signals are filtered using a digital, auto-regressive moving-average filter of the form:

$$y(k) = a_1 y(k-1) + \ldots + a_m y(k-m) + b_0 u(k) + b_1 u(k-1) + \ldots + b_n u(k-n)$$

-continued $$= \sum_{i=1}^{m} a_i y(k-i) + \sum_{j=0}^{n} b_j u(k-j)$$

where:
y(k) is the magnetic anomaly index;
k is the current sample time;
$a_i$ are auto-regressive coefficients;
$b_j$ are moving-average coefficients;
m is the number of past y(k) values included in the present value; typically m=1;
n is the number of present and past values of the filter input are to be averaged; typically n=4; and
u(k) is the difference between the compass signal and the gyroscope signal, the input to the ARMA filter.

The system is also capable of recalibrating its distance measurement apparatus using the distance between two sensed landmarks as stored in the map data base. The system uses its distance measurement apparatus (e.g., odometer) to measure the distance from one landmark sensing event to another. The systems processor, after it has identified the landmarks, can compare the measured distance to the distance stored in the map data base between the two events. The ratio of these two quantities can then be used to correct for any future errors in distance measurement.

Accordingly, the present invention enables a vehicle navigation system to more accurately determine vehicle position in situations wherein the vehicle may travel great distances without any significant deviation in the vehicle's trajectory.

DESCRIPTION OF THE SPECIFIC EMBODIMENTS

In a preferred embodiment, the present invention provides a vehicle navigation system which uses a map matching technique in conjunction with GPS signal availability and magnetic anomaly detection for determining vehicle position. In addition, by measuring the distance traveled between two external landmarks and comparing this distance to its internal map, this embodiment calculates a distance calibration factor to achieve more accurate distance measurement for subsequent navigation.

Vehicle navigation systems employing map matching techniques are described in co-pending application Ser. No. 07/884,749, Attorney Docket No. 15485-2, entitled "ROUTE GUIDANCE ON/OFF-ROUTE STATE FILTER," the complete disclosure of which is incorporated herein by reference.

Figure 1:
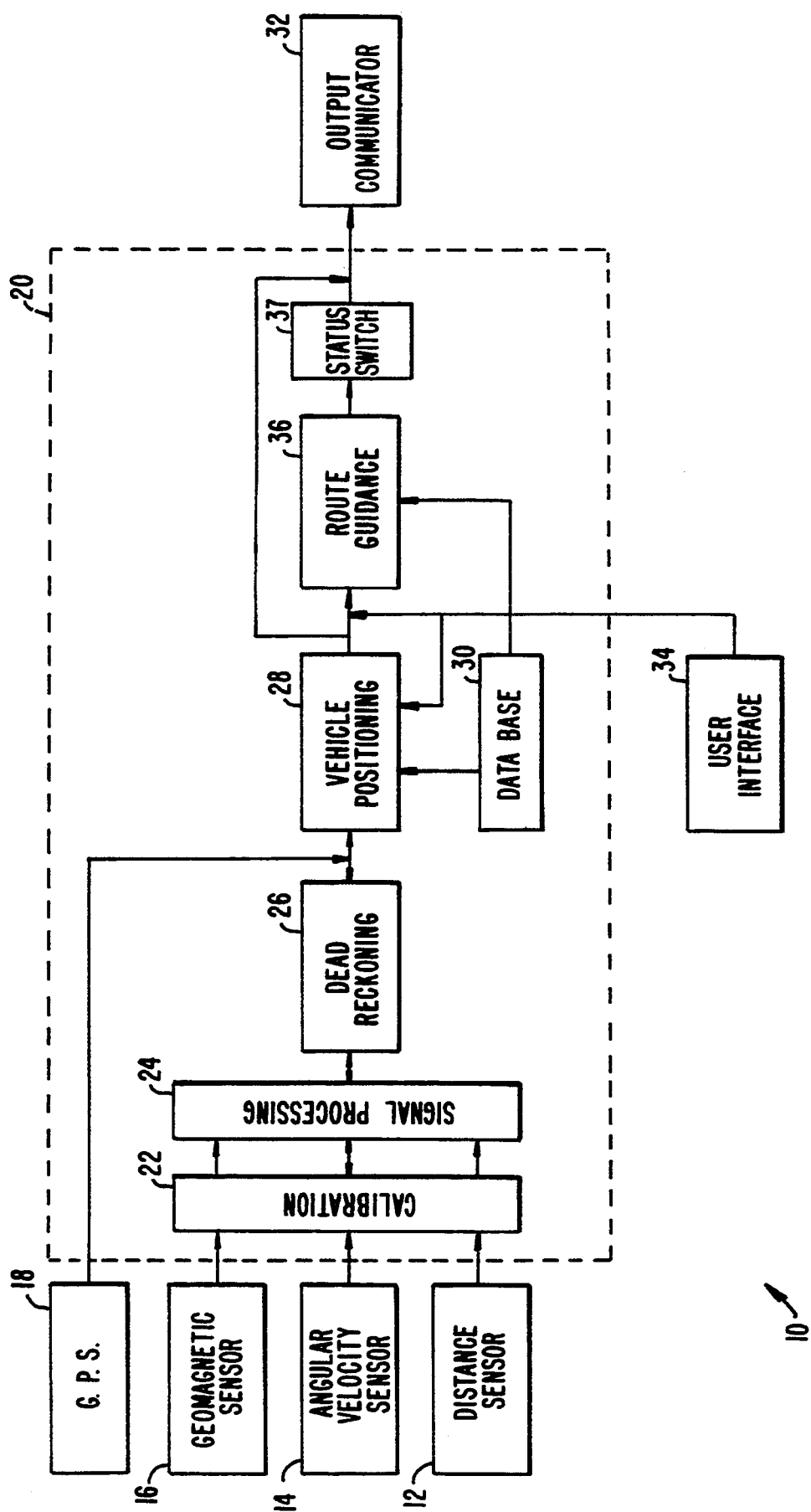
FIG. 1 is a schematic diagram showing dam flow in a vehicle navigation system constructed in accordance with the invention.
Figure 2:
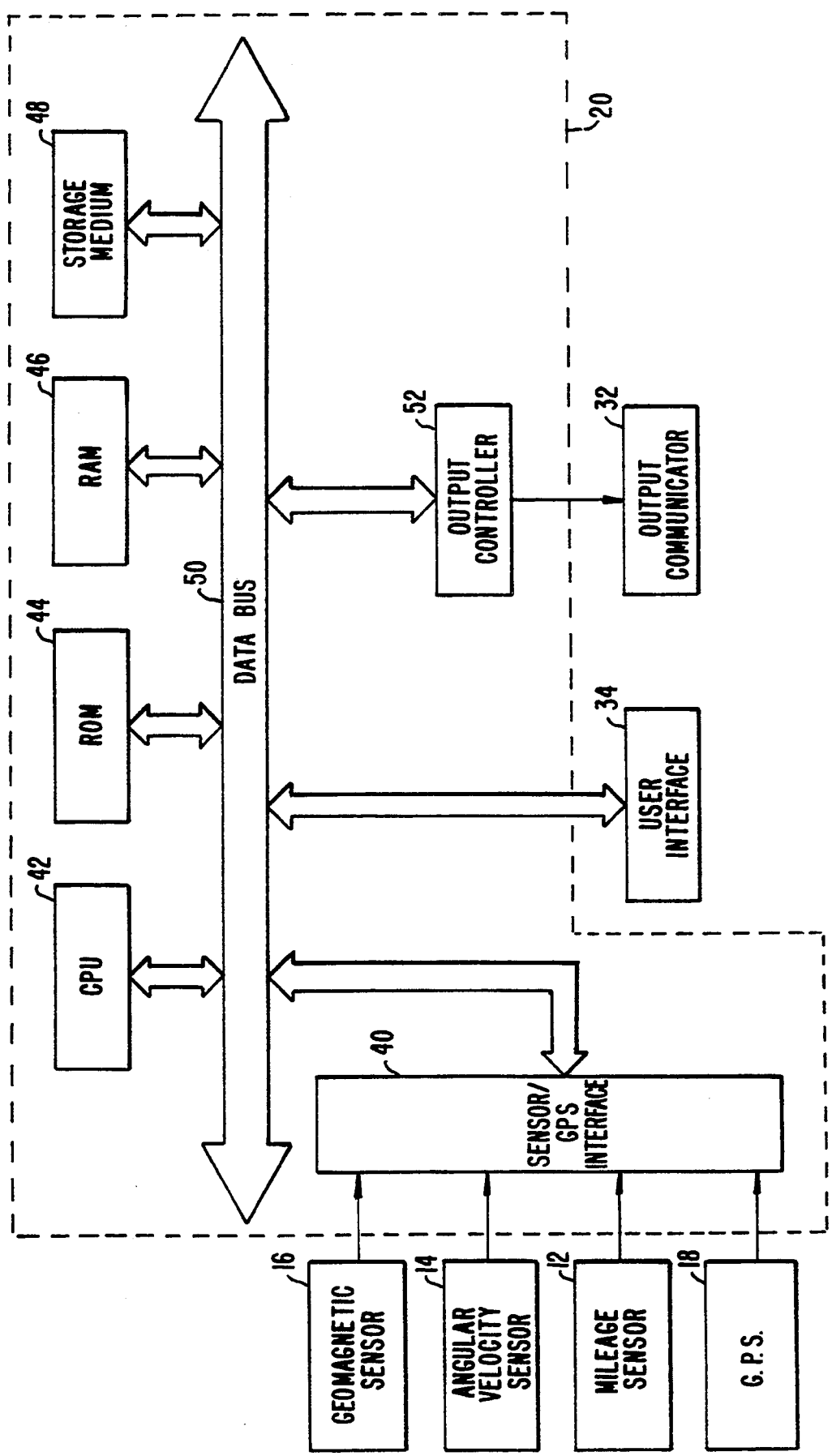
FIG. 2 is a schematic diagram of a vehicle navigation system constructed in accordance with the invention.

FIGS. 1 and 2 schematically illustrate an exemplary embodiment of a vehicle navigation system 10. Referring first to FIG. 1, vehicle navigation system 10 includes a plurality of sensors for determining vehicle position, including a distance sensor 12, angular velocity sensor 14 and geomagnetic sensor 16. In typical embodiments, the distance sensor 12 comprises an odometer; the angular velocity sensor 14 comprises a gyroscope, or a differential odometer coupled to the wheels of the vehicle; and the geomagnetic sensor 16 usually comprises a magnetic compass mounted in the vehicle. A global positioning system (GPS) data receiver 18 is provided for receiving signals from, for example, a satellite-based navigation system.

Data from sensors 12–16 is fed to the computing means 20, and adjusted to compensate for sensor measurement errors in the calibration means 22. Sensor calibration methods are described in co-pending application Ser. No. 07/883,859, Attorney Docket No. 15485-1, entitled "CALIBRATION METHOD FOR A RELATIVE HEADING SENSOR," the complete disclosure of which is incorporated herein by reference. The calibrated sensor data is transmitted to the signal processing means 24, which uses the sensor measurement data to calculate a vector describing the travel of the vehicle from a previously determined position to the measured position. This vector is then used to determine a dead-reckoned position of the vehicle by dead-reckoning means 26. The dead-reckoned position is then forwarded to map matching means 28, which compares the dead-reckoned position to a map data base 30.

The map data base 30 preferably comprises positional data such as, for example, latitude and longitude coordinates, to describe road intersections, road segments, landmarks and points of interest, and other geographical information. The data base 30 may further comprise data representing characteristics of roads or places on the map, such as road and place names, road features such as dividers, one-way restrictions, surface, speed limit, shape, elevation, and other properties. The data typically is stored in digital form on a storage medium such as an optical disk, magnetic disk or integrated circuit.

Using the data stored in data base 30, vehicle positioning module 28 generates one or more possible positions of the vehicle by comparing the dead-reckoned position to the road segments, intersections, and other geographical locations stored in the data base 30. The position possibilities are then provided to the route guidance module 36. The route guidance module 36 filters the set of position possibilities and selects from the remaining position possibilities a position deemed to be the current position of the vehicle.

Figure 3:
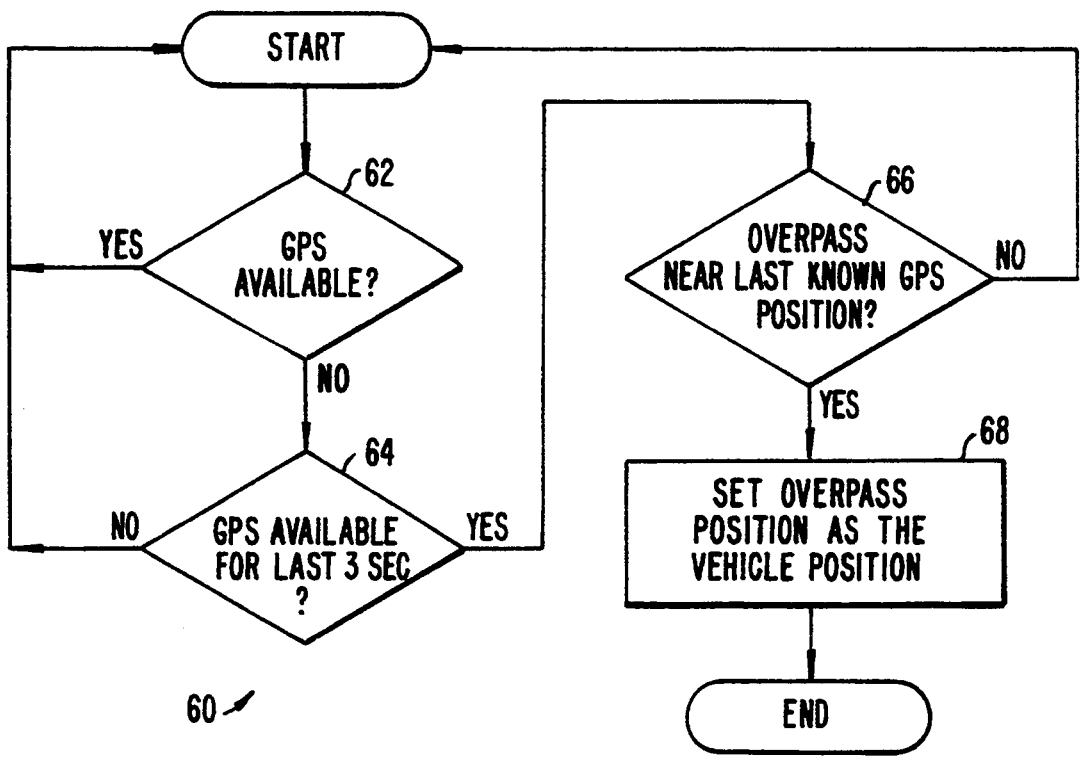
FIG. 3 is a flowchart representing the use of a global positioning system to determine vehicle position.

In addition to the above described method of determining position, the preferred embodiment of vehicle navigation system 10 uses data from the GPS receiver 18 to provide a more accurate determination of vehicle position on freeways, rural highways, and other locales where there are fewer roads, intersections, or landmarks by which to adjust vehicle position. FIG. 3 is a flowchart 60 illustrating the GPS signal availability technique of the invention. At the beginning of the process, the system continuously checks for the availability of GPS signals (62). When GPS becomes unavailable, the system then checks if it was available for an arbitrary past period (64) (3 seconds is used as an example). This step serves to filter out false detection events such as signal blockages caused by nearby trucks. If GPS was available for the past period, but is currently unavailable, the system then checks the map data base in the vicinity of the last known vehicle position for the existence of an overpass which would explain the sudden loss of GPS (66). If such an overpass exists within a reasonable distance, the system then concludes that the vehicle has passed under that overpass and the vehicle's position is reset to the position of the overpass (68).

In some environments, there may be a possibility that GPS signals are unavailable for extended periods of time. Additionally, if a vehicle passes under a tree or drives near a large truck the GPS signals may be blocked resulting in a false indication of an overpass. Because the above described technique is ultimately dependent upon the continued presence of GPS signals, it is frequently desirable to utilize an additional sensing scheme in parallel.

One such scheme involves the use of the navigation system's compass as a kind of magnetometer to sense perturbations in the earth's magnetic field due to local phenomena, such as freeway overpasses, which are largely constructed of steel. Compass measurements are known to be affected by local magnetic anomalies and often exhibit high frequency noise as a result of such anomalies. By comparing the compass measurements with relative heading measurements obtained from the system's gyroscope or differential odometer, it is possible to detect this high frequency noise. As with the GPS sensing scheme, once the magnetic anomaly has been detected, the system can then proceed to determine the absolute position of the vehicle using the most recently calculated vehicle position and its internal map.

Referring again to FIG. 1, in a preferred embodiment, the vehicle navigation system 10 uses the magnetic detection of freeway overpasses to more accurately determine vehicle position. As discussed above, a navigation system's compass exhibits high frequency noise in the vicinity of landmarks causing large magnetic anomalies such as bridges, overpasses, tunnels, geologic formations, and other structures with magnetic properties. The system 10 compares data from its compass (e.g., geomagnetic sensor 16) and gyroscope (e.g., angular velocity sensor 14) and calculates a magnetic anomaly index. Sharp increases in the magnetic anomaly index indicate the presence of a landmark.

Figure 4:
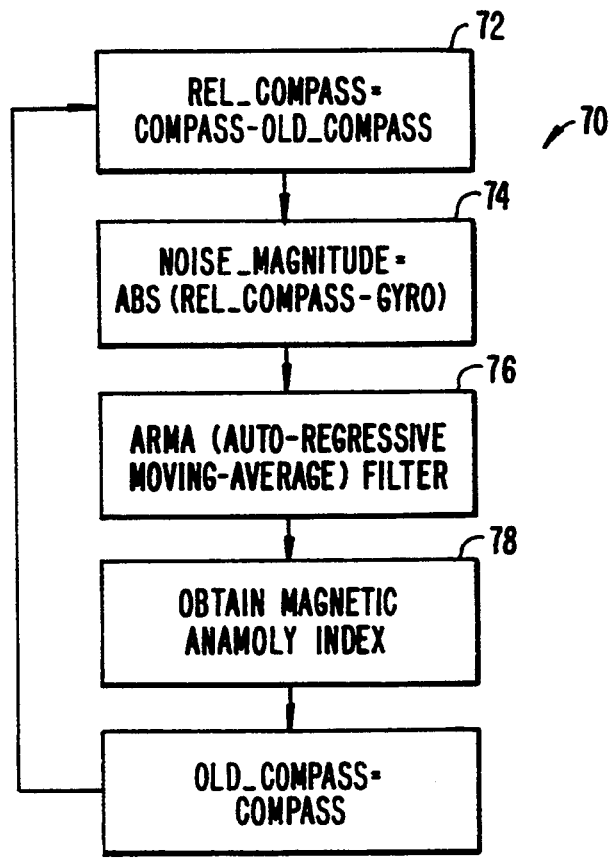
FIG. 4 is a flowchart representing the process by which a magnetic anomaly index is calculated by the navigation system.

FIG. 4 is a flowchart 70 of the method by which the system calculates the magnetic anomaly index. The system samples both the compass signal and the gyroscope signal at appropriate intervals (e.g., every 0.5 seconds). However, because the gyroscope only measures the relative displacement of the vehicle, the gyroscope signal cannot be directly compared to the compass heading measurement. Instead, the system calculates the differential compass heading (rel_compass) by subtracting the previous compass signal from the current compass signal (72). When the vehicle is in the vicinity of a magnetic anomaly, the difference between the differential compass heading and the gyroscope measurement (74) will be large because of the high amplitude noise in the compass signal. However, because of the high frequency of the compass noise, it is difficult to use the instantaneous difference between the two parameters. Thus, the difference between the differential compass heading and the gyroscope signal is filtered using a digital signal processing (DSP) technique (76).

In a preferred embodiment, the system uses an auto-regressive, moving-average (ARMA) filter, although other digital filter types may be used generate an appropriate magnetic anomaly index (78). The ARMA filter has the following form:

$$y(k) = a_1 y(k-1) + \ldots + a_m y(k-m) + b_0 u(k) + b_1 u(k-1) + \ldots + b_n u(k-n)$$

$$= \sum_{i=1}^{m} a_i y(k-i) + \sum_{j=0}^{n} b_j u(k-j)$$

where:
  y(k) is the magnetic anomaly index;
  k is the current sample time;
  $a_i$ are auto-regressive coefficients;
  $b_j$ are moving-average coefficients;
  m is the number of past y(k) values included in the present value (typically m=1);
  n is the number of present and past values of the filter input to be averaged (typically n=4); and
  u(k) is the difference between the compass signal and the gyroscope signal, the input to the ARMA filter.

The moving-average part of the filter can be used to average out the high frequency transient of the difference signal, while the auto-regressive part provides the filter with fast response. The location of the detected magnetic anomaly is then stored as the current vehicle location.

Figure 5:
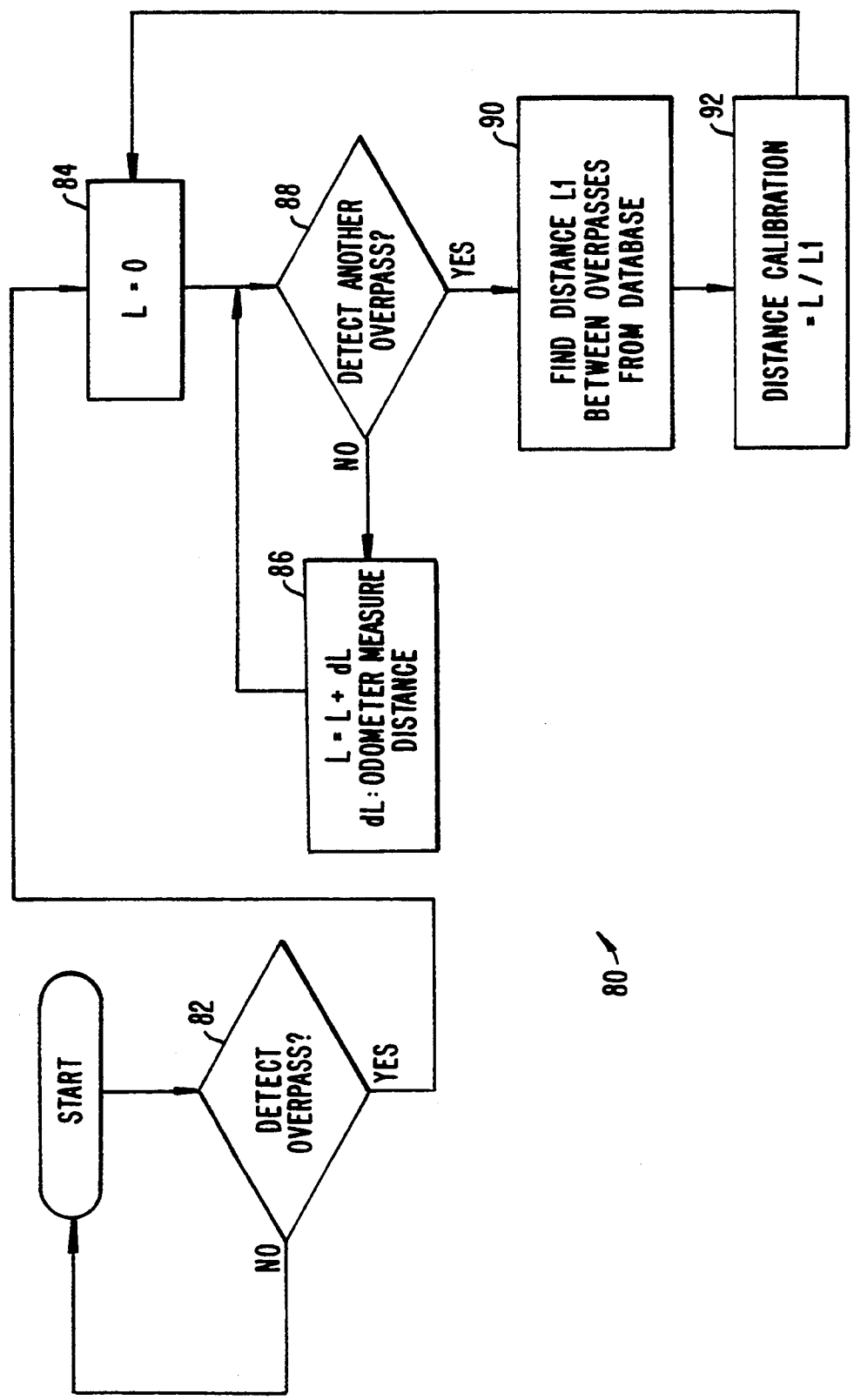
FIG. 5 is a flowchart representing the use of overpass detection data to calibrate the distance measuring apparatus of the navigation system.

In addition, by measuring the distance between the detection of two overpasses, the vehicle navigation system of FIGS. 1 and 2 calculates a calibration factor to increase the accuracy of future distance measurements. FIG. 5 is a flow chart 80 illustrating the distance calibration technique carded out in a preferred embodiment.

When an overpass is detected (82) using GPS availability or magnetic anomaly detection (described below), the system sets a distance accumulation variable, L, to zero (84). The system then continuously updates L, storing the accumulated travel distance from the last reset (86). Upon the detection of a second overpass (88), the system compares the distance traveled, as represented by L, with the known distance between the two overpasses, L1, as stored in the system's internal map (90). The ratio L/L1 can then be used to adjust subsequent distance measurements (92).

Referring back to FIG. 1, the user may select a desired destination which is input through user interface 34, typically comprising a keyboard. Route guidance module 36 compares the selected destination with the data in database 30 and identifies the selected destination among the map data. Route guidance module 36 then calculates an optimum route between the initial position of the vehicle and the desired destination, taking account of distances, road speeds, one-way streets, and, in some embodiments, variable data such as traffic information or road construction work. The selected route comprises a set of data representing the road segments, intersections, building structures, and geographical features between the initial position of the vehicle and the desired destination.

The current vehicle position selected from the position possibilities provided by vehicle positioning means 28 is compared to the data making up the selected route, to locate the position of the vehicle with respect to the route.

The driver of the vehicle is kept informed of vehicle position, upcoming maneuvers, and other relevant information through an output communication means 32, which may comprise a display screen or an audio speaker.

FIG. 2 schematically illustrates an exemplary embodiment of the hardware of computing means 20. Sensors 12 to 16 and GPS receiver 18 are coupled to computing means 20 through sensor/GPS interface 40. Data from interface 40 is transmitted to CPU 42, which performs the calibration, signal processing, dead-reckoning, vehicle positioning, and route guidance functions described above. Data base 30 may be stored in storage medium 48, with software directing the operation of computing means 20 stored in ROM 44 for execution by CPU 42. RAM 46 permits reading and writing of the information necessary to execute such software programs. Storage medium 48 may comprise a hard disk drive, CD-ROM or integrated circuit onto which digitized map information has been stored. Output controller 52, which may comprise a graphics controller for a display screen, receives dam processed by CPU 42 and transmits such data to output communicator 32, usually comprising a display screen. The user may input data, such as a desired destination, through user interface 34, typically comprising a keyboard.

The preceding description of the preferred embodiment is not intended to place limits on the manner in which the present invention is implemented. The vehicle position error correction method described herein may be implemented in many different ways. Therefore, the scope of the invention should only be limited by the following claims.

What is claimed is:

1. A method for determining a current vehicle position in a vehicle navigation system having a map data base, the method comprising the steps of:
   storing a first vehicle position;
   moving the vehicle from the first vehicle position;
   sensing an external signal while moving the vehicle;
   detecting a change in the external signal caused by the presence of a landmark;
   examining the map data base to find a most likely landmark position corresponding to the change in the external signal; and
   updating the current vehicle position to the most likely landmark position.

2. A method as in claim 1 wherein the step of sensing an external signal comprises receiving a GPS signal transmitted from a satellite.

3. A method as in claim 2 wherein the step of detecting a change in the external signal comprises detecting a failure to receive the GPS signal.

4. A method as in claim 3 wherein the landmark comprises a structure under which the vehicle passes such that the GPS signal is temporarily blocked.

5. A method as in claim 4 wherein the structure is taken from the group consisting of overpasses, tunnels and bridges.

6. A method as in claim 1 wherein the step of sensing an external signal comprises sensing a geomagnetic field to provide a first heading signal.

7. A method as in claim 6 wherein the landmark comprises a structure causing anomalies in the geomagnetic field.

8. A method as in claim 7 wherein the structure is taken from the group consisting of bridges, tunnels, buildings and geologic formations.

9. A method as in claim 6 wherein the step of detecting a change in the external signal comprises comparing the first heading signal to a second heading signal, the second heading signal being independent of the geomagnetic field, to detect a difference between the first and second heading signals caused by the landmark.

10. A method as in claim 9 wherein the second heading signal is generated by a gyroscope.

11. A method as in claim 9 wherein the step of comparing comprises filtering out differences between the first and second heading signals not caused by the landmark.

12. A method as in claim 11 wherein the filter comprises a digital auto-regressive moving-average filter of the form:

$$y(k) = \sum_{i=1}^{m} a_i y(k - i) + \sum_{j=0}^{n} b_j u(k - j)$$

where:
   $y(k)$ is a magnetic anomaly index;
   $k$ is a current sample time;
   $a_i$ are auto-regressive coefficients;
   $b_j$ are moving-average coefficients;
   $m$ is a number of past $y(k)$ values included in a present value;
   $n$ is a number of present and past values of a filter input which are to be averaged; and
   $u(k)$ is the difference between the first heading signal and the second heading signal, $u(k)$ being the input to the auto-regressive moving-average filter;
   wherein the change in the geomagnetic signal is considered to be caused by the landmark when the magnetic anomaly index exceeds a predetermined value.

13. A method as in claim 1 further comprising:
   measuring the distance between the first vehicle position and the current vehicle position to obtain a measured distance;
   calculating an actual distance between the first vehicle position and the current vehicle position from the map data base; and
   determining a distance calibration factor relating the measured distance to the actual distance.

14. Apparatus for determining a current vehicle position in a vehicle navigation system having a map data base, the apparatus comprising:
   a memory for storing a first vehicle position;
   a sensor for sensing an external signal while the vehicle moves; and
   processing means coupled to the map data base, the memory and the sensor, the processing means comprising:
   means for detecting a change in the external signal caused by the presence of a landmark;
   means for examining the map data base to find a most likely landmark position corresponding to the change in the external signal; and
   means for updating the current vehicle position to the most likely landmark position.

15. The apparatus of claim 14 wherein the external signal comprises a GPS signal transmitted from a satellite, and the sensor comprises a GPS receiver.

16. The apparatus of claim 15 wherein the means for detecting a change in the external signal detects a failure to receive the GPS signal.

17. The apparatus of claim 16 wherein the landmark comprises a structure under which the vehicle passes such that the GPS signal is temporarily blocked.

18. The apparatus of claim 17 wherein the structure is taken from the group consisting of overpasses, tunnels and bridges.

19. The apparatus of claim 14 wherein the sensor comprises a geomagnetic field sensor, the geomagnetic field sensor sensing a geomagnetic field and producing a first heading signal.

20. The apparatus of claim 19 wherein the landmark comprises a structure causing anomalies in the geomagnetic field.

21. The apparatus of claim 20 wherein the structure is taken from the group consisting of bridges, tunnels, buildings and geologic formations.

22. The apparatus of claim 19 wherein the means for detecting a change in the external signal comprises means for comparing the first heading signal to a second heading signal, the second heading signal being independent of the geomagnetic field, to detect a difference between the first heading signal and the second heading signal caused by the landmark.

23. The apparatus of claim 22 wherein the second heading signal is generated by a gyroscope.

24. The apparatus of claim 22 wherein the means for comparing comprises a filter for filtering out differences between the first and second heading signals not caused by the landmark.

25. The apparatus of claim 24 wherein the filter comprises a digital auto-regressive moving-average filter of the form:

$$y(k) = \sum_{i=1}^{m} a_i y(k-i) + \sum_{j=0}^{n} b_j u(k-j)$$

where:
- $y(k)$ is a magnetic anomaly index;
- $k$ is a current sample time;
- $a_i$ are auto-regressive coefficients;
- $b_j$ are moving-average coefficients;
- $m$ is a number of past $y(k)$ values included in a present value;
- $n$ is a number of present and past values of a filter input which are to be averaged; and
- $u(k)$ is the difference between the first heading signal and the second heading signal, $u(k)$ being the input to the auto-regressive moving-average filter;

wherein the change in the geomagnetic signal is considered to be caused by the landmark when the magnetic anomaly index exceeds a predetermined value.

26. The apparatus of claim 14 further comprising a distance sensor for measuring the distance between the first vehicle position and the current vehicle position to obtain a measured distance, wherein the processor means comprises means for calculating an actual distance between the first vehicle position and the current vehicle position from the map data base, and means for determining a distance calibration factor relating the measured distance to the actual distance.

* * * * *